(12) United States Patent
Chen et al.

(10) Patent No.: US 12,018,979 B2
(45) Date of Patent: Jun. 25, 2024

(54) SYSTEM FOR MEASURING PERIODIC DISPLACEMENT

(71) Applicant: NATIONAL CHUNG-HSING UNIVERSITY, Taichung (TW)

(72) Inventors: Jenq-Shyong Chen, Taichung (TW); Chun-Kuan Wu, Taichung (TW); Chi-Hsiang Lin, New Taipei (TW)

(73) Assignee: NATIONAL CHUNG-HSING UNIVERSITY, Taichung (TW)

( * ) Notice: Subject to any disclaimer, the term of this patent is extended or adjusted under 35 U.S.C. 154(b) by 0 days.

(21) Appl. No.: 17/806,588

(22) Filed: Jun. 13, 2022

(65) Prior Publication Data

US 2022/0404195 A1 Dec. 22, 2022

(30) Foreign Application Priority Data

Jun. 17, 2021 (TW) ................................. 110122129

(51) Int. Cl.
*G01H 9/00* (2006.01)
*G06T 1/00* (2006.01)
*G06T 7/00* (2017.01)
*G06T 7/55* (2017.01)

(52) U.S. Cl.
CPC ............. *G01H 9/00* (2013.01); *G06T 1/0007* (2013.01); *G06T 7/55* (2017.01); *G06T 7/97* (2017.01)

(58) Field of Classification Search
CPC .... G01H 9/00; G06T 7/97; G06T 7/55; G06T 1/0007
See application file for complete search history.

(56) References Cited

U.S. PATENT DOCUMENTS

| 5,739,907 A | * | 4/1998 | Chen | G01B 11/306 356/498 |
| 2018/0018778 A1 | * | 1/2018 | Haverkamp | G01B 21/042 |
| 2018/0283847 A1 | * | 10/2018 | Hatahori | G01N 29/043 |

FOREIGN PATENT DOCUMENTS

JP 2004001119 A * 1/2004

OTHER PUBLICATIONS

English translation of jp20041119 accessed from iq.ip.com Sep. 23, 2023.*

* cited by examiner

*Primary Examiner* — Kristina M Deherrera
*Assistant Examiner* — Jean F Morello
(74) *Attorney, Agent, or Firm* — Osha Bergman Watanabe & Burton LLP

(57) ABSTRACT

A system for measuring periodic displacement of an object in periodic motion at a first frequency includes a light source module, a camera module and a processor. The light source module is configured to periodically illuminate the object at a second frequency that is different from the first frequency and that is related to a sum of the first frequency and a first constant. The camera module is configured to take pictures of the object. The processor is in communication with the camera module in order to receive the pictures, and is configured to determine periodic displacement of the object based on the pictures.

9 Claims, 9 Drawing Sheets

SYSTEM FOR MEASURING PERIODIC DISPLACEMENT

CROSS-REFERENCE TO RELATED APPLICATION

This application claims priority of Taiwanese Invention Patent Application No. 110122129, filed on Jun. 17, 2021.

FIELD

The disclosure relates to a system for measurement, and more particularly to a system for measuring periodic displacement of an object in periodic motion.

BACKGROUND

Ultrasonic machining is a processing technology that utilizes a tool that vibrates at a high frequency to strike and grind a material in order to process the material. Ultrasonic machining can be utilized to easily process materials of high hardness or brittleness, and can reduce the cutting stress that is generated when the tool contacts the materials by 30% to 70%, thereby increasing service life of the tool and surface quality of processed materials. Parameters that need to be controlled and measured for ultrasonic machining include amplitude and frequency. The frequency can be easily obtained by measuring voltage or current at relevant nodes, but precise amplitude would have to be obtained by measuring actual movement of a tool tip of the tool.

A conventional technology for measuring amplitude for ultrasonic machining is a laser displacement meter. However, when the tool tip is not flat, the laser displacement meter cannot measure the amplitude precisely. Besides, measurement precision of the laser displacement meter is also affected by surface roughness of the tool, which brings about light scattering.

Another conventional technology for measuring amplitude for ultrasonic machining is a laser tool setter that measures the amplitude by generating a voltage signal based on a ratio of light occluded by the tool, and measuring a voltage of the voltage signal thus generated. However, because laser diffraction often occurs at tips, when the tool is a micro tool or has a shape that contributes to laser diffraction, the ratio of light occluded by the tool cannot reflect the actual movement or position of the tool, so the amplitude measured by the laser tool setter lacks precision. Besides, the laser tool setter that uses single-point laser to measure the amplitude is not applicable in fast measuring of an overall situation of the tool.

SUMMARY

Therefore, an object of the disclosure is to provide a system for measuring periodic displacement that can be used on an object in high-frequency motion (e.g., a tool of an ultrasonic machining apparatus) and that can alleviate at least one of the drawbacks of the prior art.

According to one aspect of the disclosure, a system for measuring periodic displacement of an object in periodic motion at a first frequency includes a light source module, a camera module and a processor. The light source module is configured to emit pulses of light that periodically illuminate the object at a second frequency based on a light-source signal. The light-source signal is a pulse signal that has the second frequency which is different from the first frequency. The second frequency is related to a sum of the first frequency and a first constant. The camera module is configured to take pictures of the object that is in the periodic motion and that is illuminated by the light source module. The processor is in communication with the camera module in order to receive the pictures of the object that are taken by the camera module, and is configured to determine periodic displacement of the object based on the pictures.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
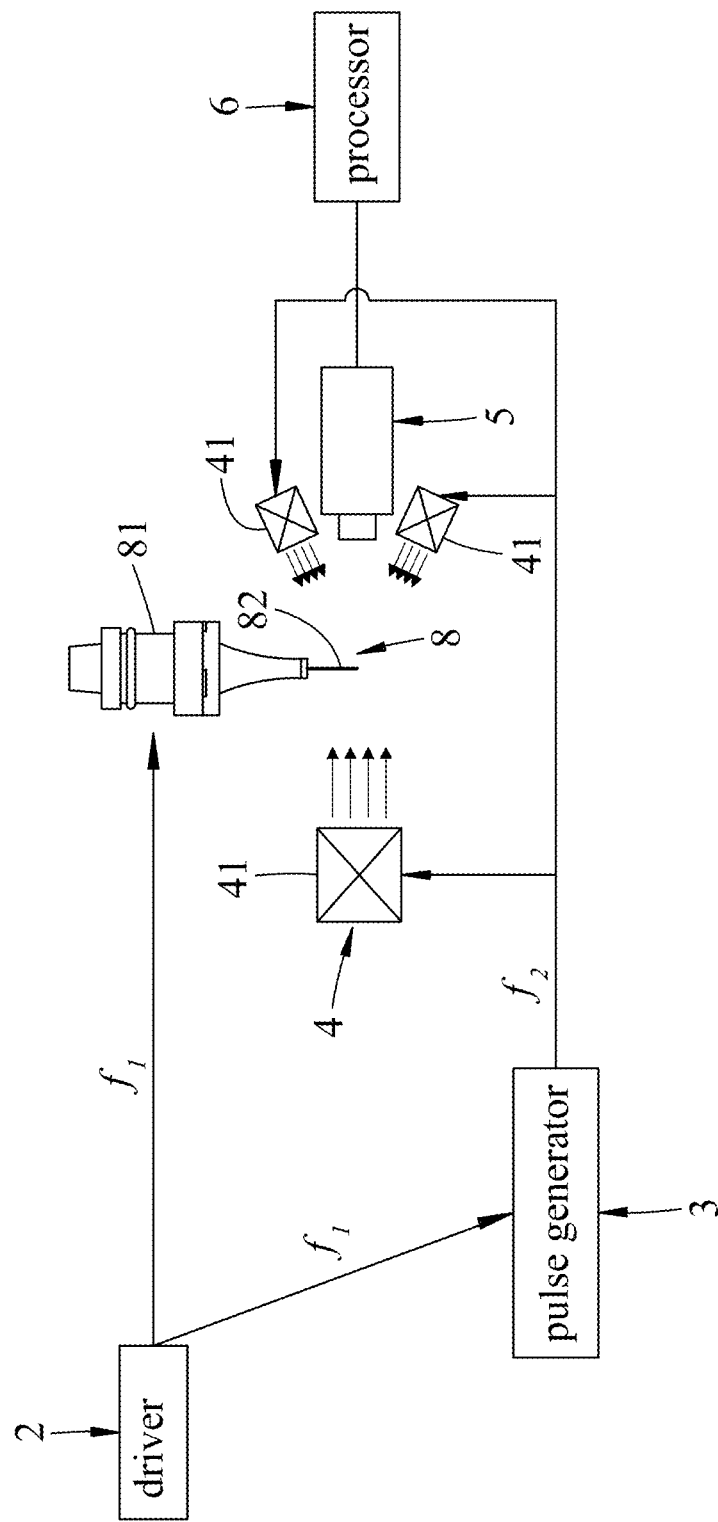
FIG. 1 is schematic diagram that exemplarily illustrates a system for measuring periodic displacement according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is schematic diagram that exemplarily illustrates a system according to an embodiment of the disclosure, wherein the system is configured to measure periodic displacement of an object 8 that is in periodic motion at a first frequency $f_1$. In the embodiment illustrated in FIG. 1, the object 8 is a tool 82 (which may be, for example, a cutting tool, a point tool, etc.) that is installed on a tool holder 81 of a machining system which may be, for example, an ultrasonic machining system. The periodic motion that the tool 82 is in may be a periodic longitudinal movement in a longitudinal direction along an axis of the tool 82 or a periodic lateral movement in a lateral direction perpendicular to the axis of the tool 82. In a case where the periodic motion the tool 82 is in is periodic longitudinal movement, the periodic displacement to be measured is the periodic displacement of the tool 82 in the longitudinal direction; in another case where the periodic motion the tool 82 is in is periodic lateral movement, the periodic displacement to be measured is the periodic displacement of the tool 82 in the lateral direction.

Referring to FIG. 1, the system includes a driver 2, a pulse generator 3, a light source module 4, a camera module 5 and a processor 6. The driver 2 is configured to provide a drive signal that has the first frequency $f_1$ and that drives the object 8 (e.g., drives the tool holder 81 and in turn drives the tool 82) to move in the periodic motion at the first frequency $f_1$. According to some embodiments, the first frequency $f_1$ may be an ultrasonic frequency that is higher than 18 kHz, or a speed frequency that is equal to or less than 60,000 rpm (equivalent to 1 kHz).

The pulse generator 3 is in communication with the driver 2 and the light source module 4. The pulse generator 3 is configured to receive the drive signal from the driver 2, to generate, based on the drive signal, a light-source signal that is a pulse signal and that has a second frequency $f_2$, and to deliver the light-source signal thus generated to the light source module 4, thereby driving the light source module 4 to periodically illuminate the object 8 at the second frequency $f_2$. The duty cycle of the light-source signal may be determined based on desired imaging effect. Specifically, a larger duty cycle contributes to blurred images unfavorable for precise measurement of the periodic displacement, and a smaller duty cycle contributes to insufficient light for the camera module 5 to take a clear picture of the object 8 that is also unfavorable for precise measurement of the periodic displacement. According to some embodiments, the duty cycle of the light-source signal may be selected to be no larger than 10%. In certain embodiments, the duty cycle of the light-source signal may be within a range of from 1% to 10%, or within a stricter range of from 1% to 5%.

The second frequency $f_2$ is different from the first frequency $f_1$ and is related to a sum of the first frequency $f_1$ and a first constant. Specifically, the second frequency $f_2$ may have a relationship with the first frequency $f_1$ that fulfills an equation of:

$$f_2 = \frac{f_1 + k}{n},$$

in which k denotes the first constant, and n denotes a second constant which is a natural number and which may be selected from 1 to 5. The value of the first constant k may be determined based on a desired frequency of a slow motion that the periodic motion of the object 8 is to appear (based on aliasing and stroboscope effects) with the light source module 4 illuminating the object 8 at the second frequency $f_2$. The frequency of the slow motion is equal to the value of the first constant k. According to some embodiments where the camera module 5 is a normal camera that is not a high-speed camera capable of capturing at least 1,000 image frames per second, the value of the first constant k may be selected such that $-50 \leq k \leq 50$, $-10 \leq k \leq 10$, or $-5 \leq k \leq 5$.

The light source module 4 is configured to receive the light-source signal from the pulse generator 3, and to emit pulses of light (i.e., to produce regular flashes of light) that periodically illuminate the object 8 at the second frequency $f_2$ based on the light-source signal. The light source module 4 may include multiple light-emitting devices 41 that are disposed at two opposite sides of the object 8 as illustrated in FIG. 1, but the disclosure is not limited thereto. In other embodiments, the light source module 4 may include one or more light-emitting devices 41 that are all disposed at one side of the object that is, for example, a first side near the camera module 5 or a second side opposite to the first side. The number of light-emitting device(s) 41 that the light source module 4 includes and positions of the light-emitting device(s) 41 may be determined based on illumination environment or requirements on site. In cases where the light source module 4 includes multiple light-emitting devices 41, the light-emitting devices 41 periodically illuminate the object 8 at the second frequency $f_2$ in synchronization. According to some embodiments, the light source module 4 may be a laser module that emits laser by utilizing, for example, at least one laser diode.

The object 8 that is periodically illuminated by the light source module 4 at the second frequency $$f_2 = \frac{f_1 + k}{n}$$

presents an illusion of moving in slow motion that has a relatively low frequency (e.g., at most 50 Hz with the value of k being $-50 \leq k \leq 50$) in comparison with the real frequency (i.e., the first frequency $f_1$ which may be an ultrasonic frequency higher than 18 kHz) of the periodic motion that the object 8 is actually in. In this way, the high-frequency periodic motion of the object 8 that a normal camera (which the camera module 5 may be) may be unable to film is able to appear as if it were in the slow motion that can be filmed by the normal camera and that maintains the amplitude of the original high-frequency periodic motion.

The camera module 5 is in communication with the processor 6, and is configured to periodically take pictures of the object 8 that is in the periodic motion and that is illuminated by the light source module 4, and to send the pictures to the processor 6. The camera module 5 takes pictures of the object 8 at a frame rate of a third frequency $f_3$ (in frames per second (fps)), in order to sample the slow motion of the object 8 that can be observed with the light source module 4 illuminating the object 8 at the second frequency $f_2$. The camera module 5 takes at least two pictures with respect to each cycle of the slow motion so that a full view of the slow motion may be acquired. Therefore, the value of the third frequency $f_3$ fulfills an equation of:

$$\frac{f_3}{|k|} \geq 2,$$

which means that the value of the third frequency $f_3$ is no less than twice the absolute value of the first constant k. In some embodiments, the value of third frequency $f_3$ is selected to be no less than ten times the absolute value of the first constant k (i.e., to fulfill an equation of $$\frac{f_3}{|k|} \geq 10),$$

in order to improve accuracy of the measured periodic displacement.

The exposure time of the camera module 5 is set based on the desired imaging effect. The exposure time being too long would result in blurred images because too much action is filmed in one picture; the exposure time being too short would result in insufficient light for the camera module 5 to take a clear picture. Both situations are unfavorable for precise measurement of the periodic displacement. In some embodiments where the camera module 5 is an industrial camera (e.g., a Basler ace USB 3.0 camera), the exposure time is set to be within a range of 0.001 seconds to 0.1 seconds.

Figure 2:
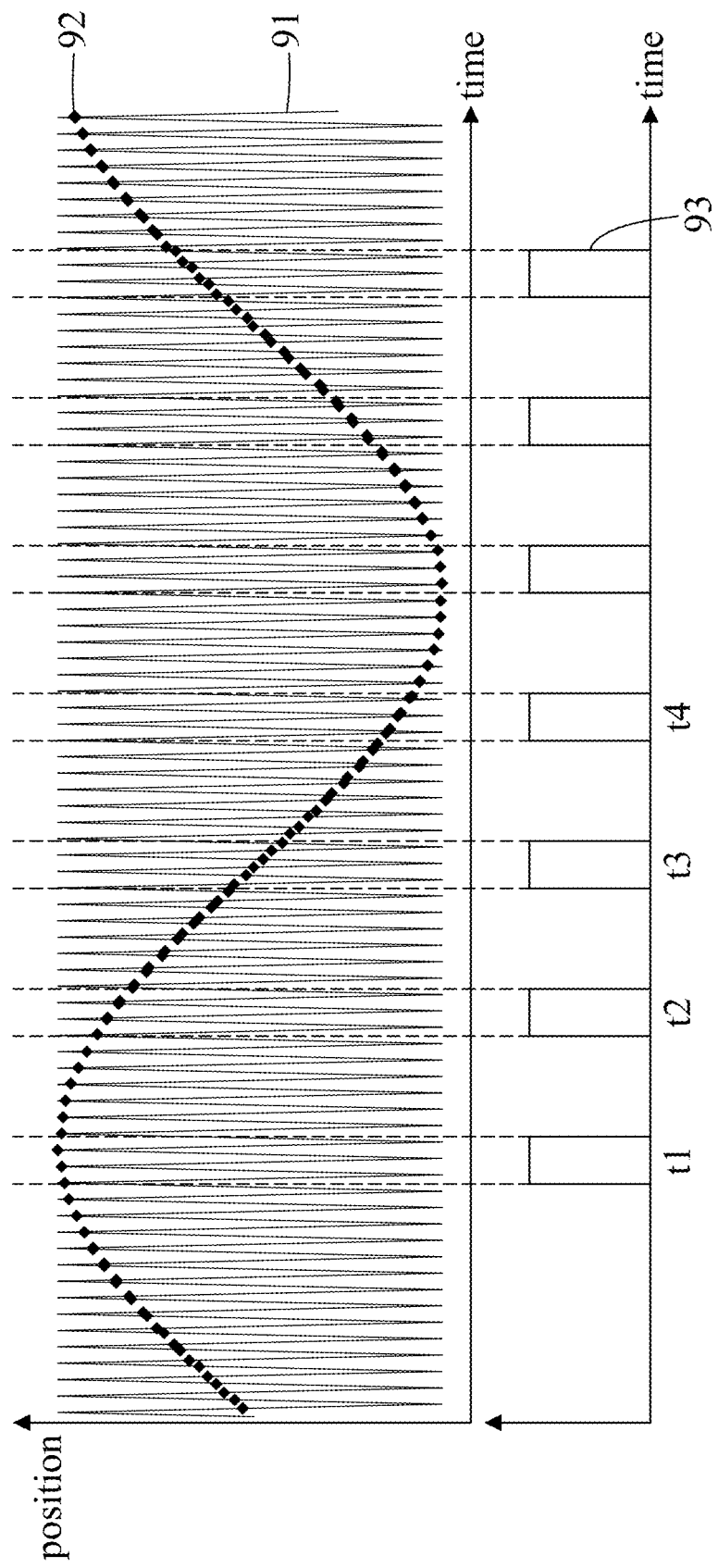
FIG. 2 is a combination chart that exemplarily illustrates movement of an object in periodic motion and exposure time of a camera module for taking pictures of the object according to an embodiment of the disclosure.
Figure 3:
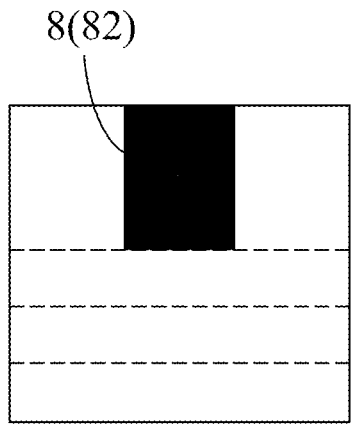
FIGS. 3-6 are schematic diagrams that represent pictures of a tool that are taken by a camera module according to an embodiment of the disclosure, respectively.
Figure 4:
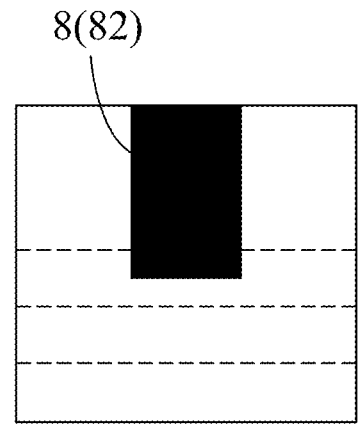
Figure 5:
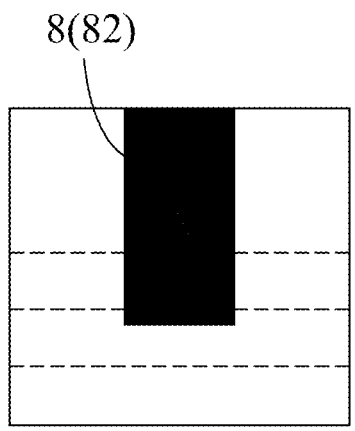
Figure 6:
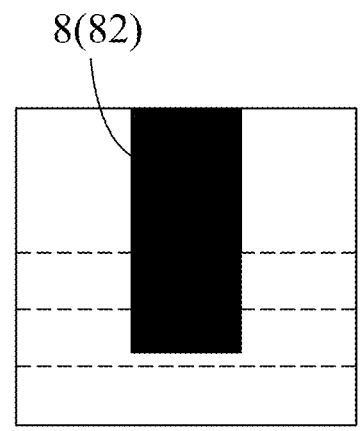
Figure 7:
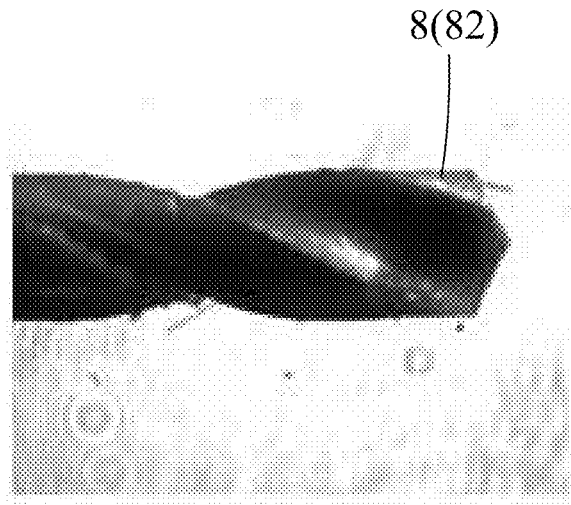
FIG. 7 exemplarily illustrates a picture of the tool according to an embodiment of the disclosure.

FIG. 2 exemplarily illustrates waveforms of the periodic motion 91 and the slow motion 92 of the object 8 according to an embodiment of the disclosure, wherein the points of the curve of the slow motion 92 indicate positions (e.g., positions in the longitudinal direction when the object 8 is in the periodic longitudinal movement) of the object 8 when the object 8 is illuminated by pulses of light emitted by the light source module 4. In this embodiment, the camera module 5 is implemented by a Basler ace USB 3.0 camera with a frame rate of 55 fps, and the second frequency $f_2$ is obtained by an equation of $f_2=f_1+5$ (i.e., with the first constant k being 5, and the second constant n being 1), so that the slow motion 92 that is simulated with the light source module 4 periodically illuminating the object 8 at the second frequency $f_2$ has a frequency of 5 Hz. FIG. 2 also shows the exposure time 93 (including exposure time periods t1, t2, t3 and t4) of the camera module 5 that is adequate for the camera module 5 to take clear pictures of the object 8 under the pulses of light emitted by the light source module 4. Further referring to FIGS. 3-7, four images (with broken lines added to indicate different horizontal levels) representing four pictures of the object 8 (i.e., the tool 82) that are taken by the camera module 5 during the exposure time periods t1, t2, t3 and t4 are schematically illustrated in FIGS. 3-6, respectively, and the real picture that the camera module 5 took during the exposure time period t4 is shown in FIG. 7.

The processor 6 is configured to receive the pictures of the object 8 taken by the camera module 5 therefrom, and to determine the periodic displacement of the object 8 based on the pictures. Specifically, the processor 6 is configured to determine multiple pieces of position information with respect to the pictures, respectively, and to calculate the periodic displacement of the object 8 based on the pieces of position information thus determined. Details as to how the processor 6 determines the multiple pieces of position information and calculates the periodic displacement will be described later.

Figure 8:
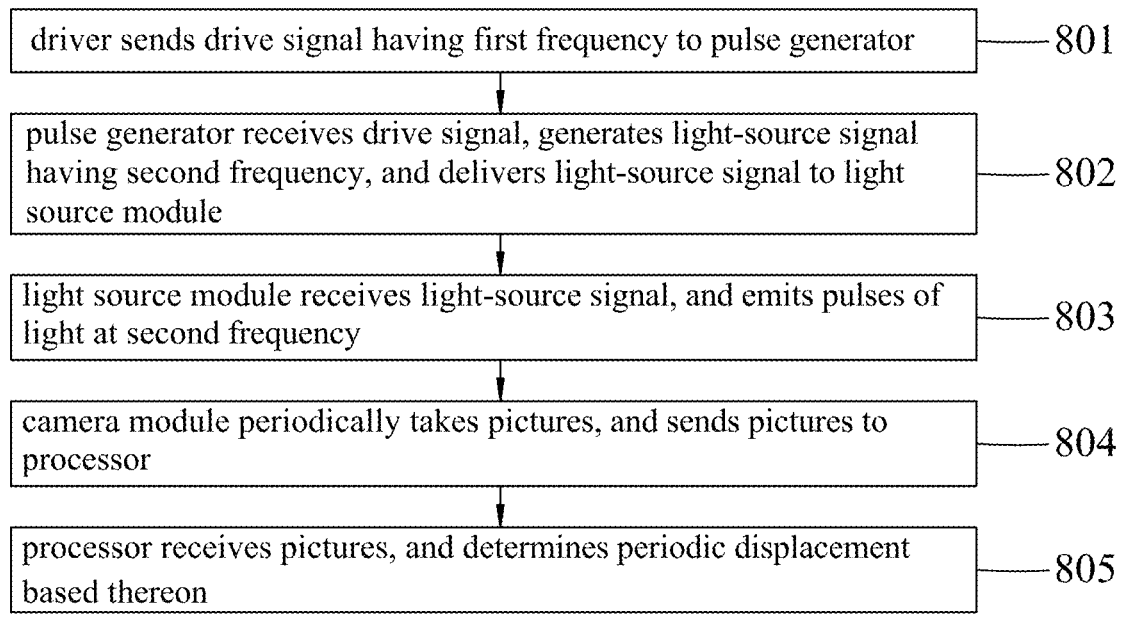
FIG. 8 is a flow chart that exemplarily illustrates a method to be performed by the system of FIG. 1 according to an embodiment of the disclosure.

In some embodiments, the system performs a method as illustrated in FIG. 8 to measure the periodic displacement of the object 8. The method includes Steps 801-805.

In Step 801, the driver 2 sends the drive signal that has the first frequency $f_1$ to the pulse generator 3. The drive signal is also sent to a controller (not shown in the drawings) that controls the object 8, in order to drive the object 8 to move in the periodic motion at the first frequency $f_1$.

In Step 802, the pulse generator 3 receives the drive signal from the driver 2, generates the light-source signal that is a pulse signal and that has the second frequency $f_2$ which is obtained based on the first frequency $f_1$, the predetermined first constant k and the predetermined second constant n and by utilizing the equation of $$f_2 = \frac{f_1 + k}{n},$$

and delivers the light-source signal to the light source module 4.

In Step 803, the light source module 4 receives the light-source signal from the pulse generator 3, and emits pulses of light that periodically illuminate the object 8 at the second frequency $f_2$.

In Step 804, the camera module 5 periodically (at the third frequency $f_3$) takes pictures of the object 8 (i.e., the tool 82) that is in the periodic motion and that is illuminated by the light source module 4, and sends the pictures to the processor 6.

In Step 805, the processor 6 receives the pictures of the object 8, and determines the periodic displacement of the object 8 based on the pictures. It should be noted that some of Steps 801-805 may overlap in time. For example, Step 803 and Step 804 may be performed simultaneously.

Figure 9:
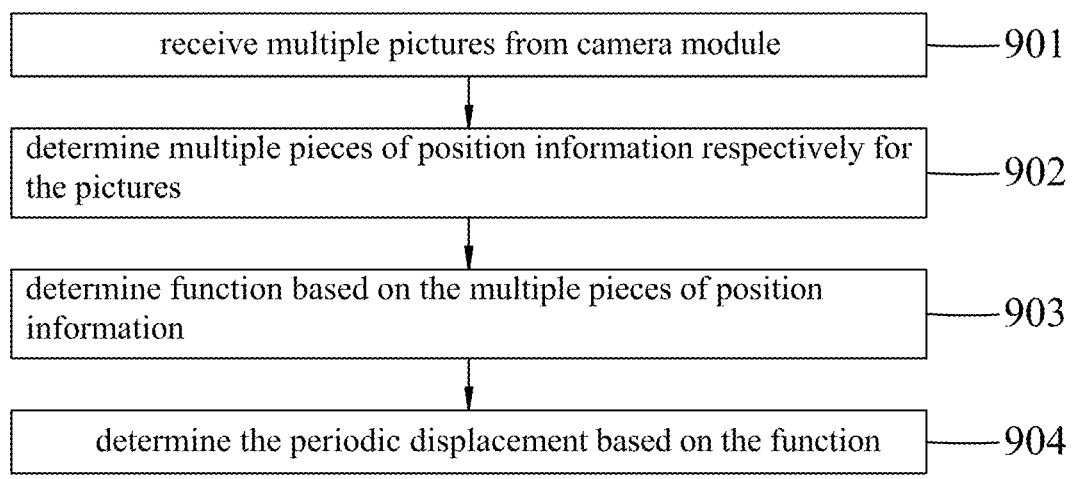
FIG. 9 is a flow chart that exemplarily illustrates sub-steps of Step 805 of FIG. 8 according to an embodiment of the disclosure.

According to some embodiments, Step 805 may include Sub-steps 901-904 illustrated in FIG. 9.

In Sub-step 901, the processor 6 receives multiple pictures of the object 8 (i.e., the tool 82) from the camera module 5.

In Sub-step 902, the processor 6 determines multiple pieces of position information respectively for the multiple pictures by, for each of the multiple pictures, determining a pixel position related to the object 8 in the picture to serve as the piece of position information. The pixel position may be determined by utilizing a first procedure illustrated in FIG. 10 that determines the pixel position based on an outline of the object 8, a second procedure illustrated in FIG. 12 that determines the pixel position based on a characteristic region, or a third procedure illustrated in FIG. 14 that determines the pixel position based on an axis vector.

Figure 10:
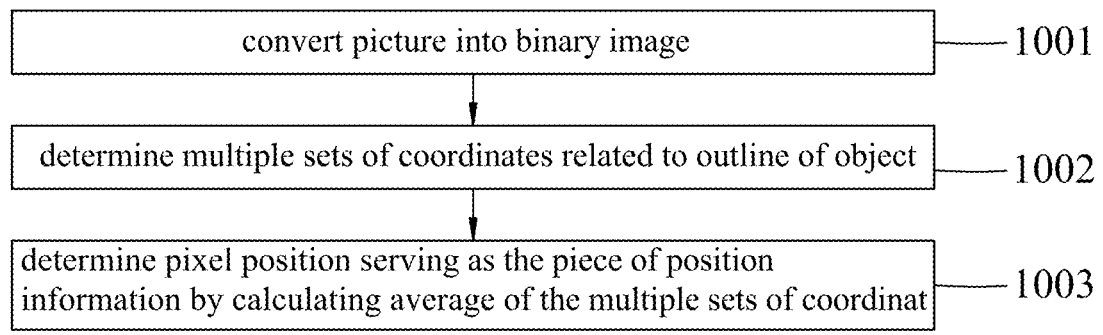
FIG. 10 is a flow chart that exemplarily illustrates a first procedure for determining a pixel position according to an embodiment of the disclosure.

Referring to FIG. 10, the first procedure includes Steps 1001-1003 that are to be performed with respect to each of the pictures received from the camera module 5.

Figure 11:
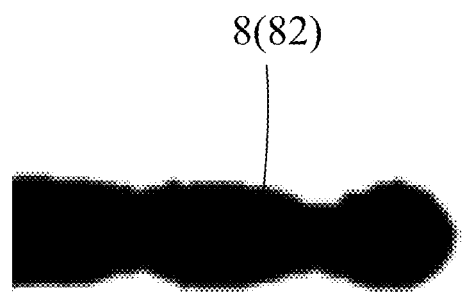
FIG. 11 is a schematic diagram that exemplarily illustrates a binary image according to an embodiment of the disclosure.

Step 1001 is to convert the picture into a binary image by, for example, performing image thresholding on the picture. A binary image thus obtained is exemplarily illustrated in FIG. 11, wherein an area occupied by the object 8 is black, and the remaining area is white.

Step 1002 is to determine multiple sets of coordinates that are related to the outline of the object 8 in the picture based on the binary image. The outline of the object 8 may be determined by finding every black pixel that is adjacent to a white pixel. In an embodiment of the disclosure, the multiple sets of coordinates are pixel positions of the pixels on the outline of the object 8.

Step 1003 is to determine the pixel position that serves as the piece of position information for the picture by calculating an average of the multiple sets of coordinates.

Figure 12:
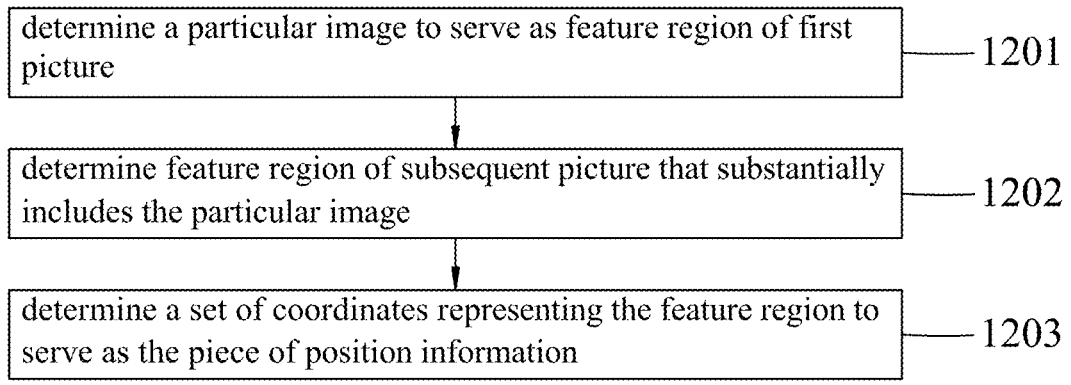
FIG. 12 is a flow chart that exemplarily illustrates a second procedure for determining a pixel position according to an embodiment of the disclosure.

Referring to FIG. 12, the second procedure includes Steps 1201-1203, wherein Step 1201 is to be performed with respect to a first one of the pictures received from the camera module 5 (referred to as "first picture" hereinafter), Step 1202 is to be performed with respect to each of the rest of the pictures received from the camera module 5 (referred to as "subsequent picture" hereinafter), and Step 1203 is to be performed with respect to each of the first and subsequent pictures.

Figure 13:
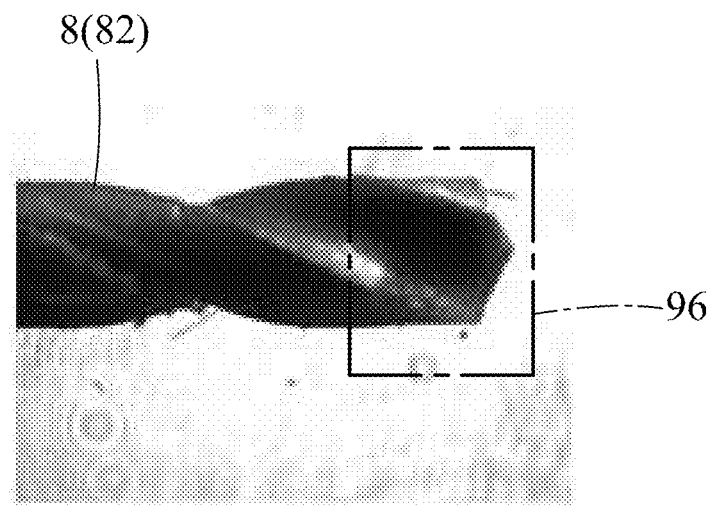
FIG. 13 is exemplarily illustrates a particular image and a feature region of a first picture according to an embodiment of the disclosure.

Step 1201 is to determine a particular image related to a portion of the object 8 in the first picture to serve as a feature region of the first picture. According to some embodiments, the portion of the object 8, to which the particular image is related, may be a front end of the object 8. FIG. 13 exemplarily illustrates the first picture that includes the particular image 96 related to the front end of the object 8, wherein the reference numeral 96 also denotes the feature region of the first picture.

Step 1202 is to determine, with respect to each of the subsequent pictures, a feature region of the subsequent picture that substantially includes the particular image. Specifically, for the subsequent picture, an image therein that resembles the particular image and that has a shape and a size that are the same as those of the particular image is determined to serve as the feature region.

Step 1203 is to determine, with respect to each picture among the first and subsequent pictures, a set of coordinates that represents the feature region to serve as the piece of position information for the picture. According to an embodiment, the set of coordinates that represents the feature region may be a pixel position of a central pixel at a center of the feature region.

Figure 14:
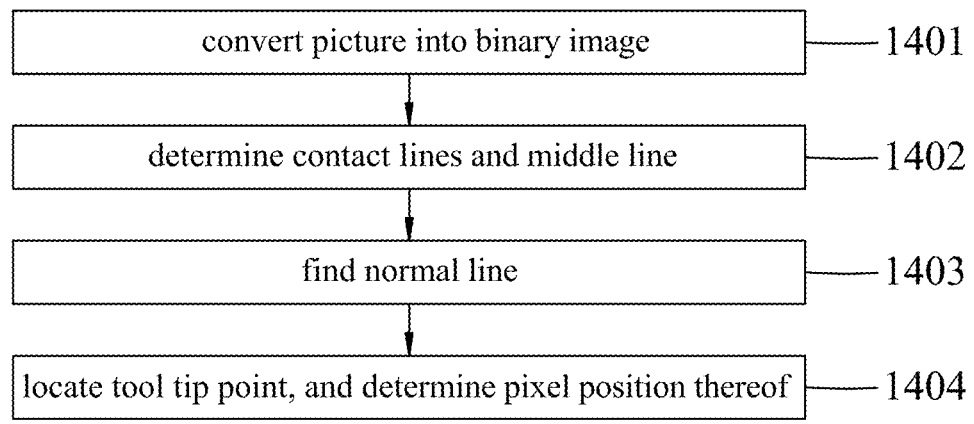
FIG. 14 is a flow chart that exemplarily illustrates a third procedure for determining a pixel position according to an embodiment of the disclosure.

Referring to FIG. 14, the third procedure includes Steps 1401-1404 that are to be performed with respect to each of the pictures received from the camera module 5.

Step 1401 is to convert the picture into a binary image by, for example, performing image thresholding on the picture. In an embodiment, in the binary image thus obtained, an area occupied by the object 8 is black, and the remaining area is white.

Step 1402 is to determine a contact line with respect to each of two sides of the object 8 relative to the axis of the object 8, wherein the contact line is a straight line that has the greatest possible number of contacts with the outline of the object 8 at the side without crossing the object 8. Then, a middle line that lies between the two contact lines is determined, wherein distances in any normal direction of the middle line between the two contact lines and the middle line are the same.

Step 1403 is to find a normal line that is normal to the middle line and that contacts the outline of the object 8 but does not cross the object 8.

Step 1404 is to locate a pixel, at which the middle line determined in Step 1402 and the normal line determined in Step 1403 intersect, to serve as a tool tip point, and to determine a pixel position of the pixel to serve as the piece of position information with respect to the picture.

Figure 15:
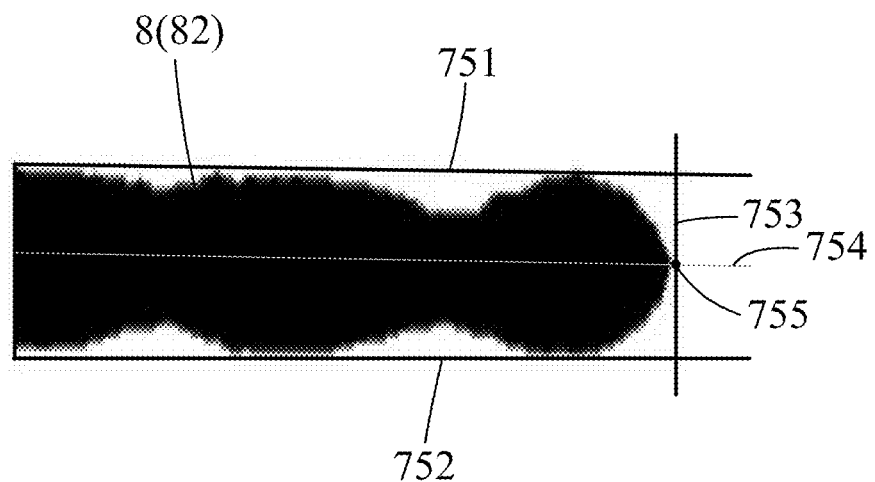
FIG. 15 is a schematic diagram that exemplarily illustrates a tool tip point according to an embodiment of the disclosure.

Examples of the two contact lines 751, 752 at the two sides of the object 8, the middle line 754 between the contact lines 751, 752, the normal line 753 that is normal to the middle line 754 and that contacts the outline of the object 8 only at one point, and the tool tip point 755 are shown in FIG. 15 according to an embodiment of the disclosure.

Returning to FIG. 9, after the pieces of position information respectively for the pictures are determined in Step 902, in Step 903, the processor 6 determines a function that is related to the periodic motion of the object 8 by performing curve fitting on the pieces of position information. Specifically, the pixel positions indicated by the pieces of position information may be charted in relation to time points the respectively pictures were taken. In this way, a curve that includes multiple data points corresponding respectively to the pictures and that is roughly a sine wave can be obtained. Each data point of the curve includes two attributes, one of which represents the time point the corresponding picture was taken, and the other of which represents a displacement of the object 8 at the time point, wherein the displacement is relative to a baseline position of the tool 8 and can be derived from the piece of position information for the corresponding picture. In an embodiment, the baseline position of the tool 8 is an initial position of the tool 8 before the tool 8 starts to work (i.e., starts to be in the periodic motion). Next, values of parameters of A, w and d of a basis function of y=A sin(wt+d) may be obtained by performing curve fitting (including, for example, least squares fitting) on the pieces of position information or on the data points, wherein y represents the amplitude, t represents time, and A represents the peak amplitude.

In Step 904, the processor determines the periodic displacement of the object 8 based on the function determined in Step 903. Specifically, the periodic displacement may be obtained by multiplying the value of A by a camera constant of the camera module 5 that is in the unit of μ m/pixel. The camera constant may be obtained by, for example, using the camera module 5 to take a picture that includes a round spot having a given diameter in micrometer (μm), calculating a length of the diameter of the round spot in the picture in number of pixels (pixel), and dividing the given diameter in μm by the length in pixel.

Figure 16:
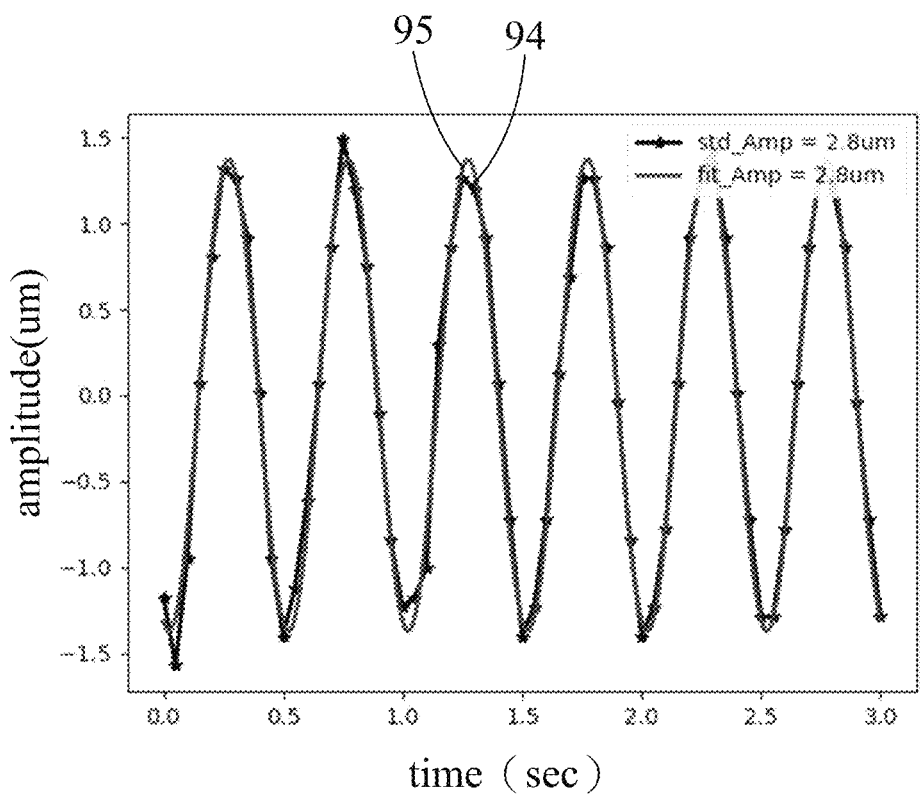
FIG. 16 is a chart that exemplarily illustrates an original curve and a fitted curve according to an embodiment of the disclosure.

FIG. 16 exemplarily illustrates an original curve 94 constructed by data points representing the pieces of position information and a fitted curve 95 that is a sine wave obtained by performing curve fitting on the data points according to an embodiment of the disclosure.

Variations may be made to the process illustrated in FIG. 9 without going beyond the present disclosure. For example, the value of the peak amplitude A may be obtained by calculating a first average of displacements represented by a batch of a certain number of the data points that have relative maximum displacements with respect to the baseline position, calculating a second average of displacements represented by another batch of the certain number of the data points that have relative minimum displacements with respect to the baseline position, and subtracting the second average from the first average. As another example, the value of the peak amplitude A may be obtained by an equation of:

$$\sqrt{\frac{\sum D_i^2}{a}} = A \times \frac{\sqrt{2}}{2},$$

wherein a is the number of the data points, and $D_i$ represents the displacement represented by an $i^{th}$ data point.

In summary, the disclosed system that periodically illuminates the object 8 to enable a high-frequency periodic motion of the object 8 to appear as a slow motion based on aliasing and stroboscope effects, and samples the slow motion by the camera module 5 taking pictures of the object 8 in order to derive the periodical displacement of the object 8 is beneficial at least in the following aspects: i) measurement precision is not affected by surface roughness or the shape of the object 8 because the movement or the position of the object 8 is observed by analyzing pictures the camera module 5 takes; ii) a high-speed camera is not required, thereby lowering the cost; and iii) it is easy for a user of the system to perceive the actual situation (including moving direction, twisting direction, etc.) of the object 8 by viewing image data (i.e., the pictures) the camera module 5 generates.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A system for measuring periodic displacement of an object in periodic motion at a first frequency, the system comprising:
   a light source module configured to emit pulses of light that periodically illuminate the object at a second frequency based on a light-source signal, the light-source signal being a pulse signal that has the second frequency which is different from the first frequency, the second frequency is related to a sum of the first frequency and a first constant;
   a camera module configured to take pictures of the object that is in the periodic motion and that is illuminated by said light source module; and
   a processor in communication with said camera module in order to receive the pictures of the object that are taken by said camera module, and configured to determine periodic displacement of the object based on the pictures.

2. The system of claim 1, wherein said light source module is configured to illuminate the object with the pulses of light at the second frequency which has a relationship with the first frequency that fulfills an equation of:

$$f_2 = \frac{f_1 + k}{n},$$

in which $f_2$ denotes the second frequency, $f_1$ denotes the first frequency, k denotes the first constant, and n denotes a second constant which is a natural number.

3. The system of claim 2, wherein said camera module is configured to periodically take the pictures of the object at a third frequency that is no less than twice the absolute value of the first constant k.

4. The system of claim 1, wherein said processor is configured to:
   determine multiple pieces of position information with respect to the pictures, respectively; and
   calculate the periodic displacement of the object based on the pieces of position information.

5. The system of claim 4, wherein said processor is configured to:
   determine a function that is related to the periodic motion of the object by performing curve fitting on the pieces of position information; and
   determine the periodic displacement of the object based on the function thus determined.

6. The system of claim 4, wherein said processor is configured to determine the multiple pieces of position information by:
   with respect to each of the pictures,
      determining multiple sets of coordinates that are related to an outline of the object in the picture, and
      determining the piece of position information for the picture by calculating an average of the multiple sets of coordinates.

7. The system of claim 4, wherein said processor is configured to determine the multiple pieces of position information by:
   with respect to each of the pictures,
      determining a feature region of the picture that substantially includes a particular image related to a portion of the object, and
      determining a set of coordinates that represents the feature region and that serves as the piece of position information for the picture.

8. The system of claim 1, further comprising:
   a driver configured to provide a drive signal that drives the object to move in the periodic motion at the first frequency; and
   a pulse generator in communication with said driver and said light source module, said pulse generator being configured to receive the drive signal from said driver, to generate the light-source signal based on the drive signal, and to deliver the light-source signal thus generated to said light source module.

9. The system of claim 1, wherein said light source module is configured to emit the pulses of light based on the light-source signal that has a duty cycle which is not larger than ten percent.

\* \* \* \* \*